United States Patent
Deng

(10) Patent No.: US 7,707,301 B2
(45) Date of Patent: Apr. 27, 2010

(54) METHOD AND APPARATUS FOR EQUALIZING LOAD OF STREAMING MEDIA SERVER

(75) Inventor: Xuelai Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 999 days.

(21) Appl. No.: 10/488,796

(22) PCT Filed: Aug. 15, 2002

(86) PCT No.: PCT/CN02/00564

§ 371 (c)(1),
(2), (4) Date: Sep. 16, 2004

(87) PCT Pub. No.: WO03/021931

PCT Pub. Date: Mar. 13, 2003

(65) Prior Publication Data

US 2005/0027875 A1    Feb. 3, 2005

(30) Foreign Application Priority Data

Sep. 6, 2001    (CN) .............................. 01 1 25689

(51) Int. Cl.
*G06F 15/16* (2006.01)
(52) U.S. Cl. ....................................... 709/231; 709/249
(58) Field of Classification Search ................. 709/213, 709/227–229, 230–231, 238, 245, 249; 370/230.1, 370/231, 238, 245, 249, 235, 389
See application file for complete search history.

(56) References Cited

U.S. PATENT DOCUMENTS 6,182,139 B1 * 1/2001 Brendel ...................... 709/226

(Continued)

FOREIGN PATENT DOCUMENTS

JP    11 298 526 A    10/1999

(Continued)

OTHER PUBLICATIONS

Cisco Systems, Cisco IOS Security Configuration Guide, Version 12.2, May 2001, pp. 1-577.*

(Continued)

*Primary Examiner*—Shawki S Ismail
*Assistant Examiner*—Grant Ford
(74) *Attorney, Agent, or Firm*—Ladas & Parry LLP

(57) ABSTRACT

The invention deals with a method and apparatus of realizing load equalizing on the stream media server. The load equalizer is placed in front of the stream media server and the servers are trusted by the load equalizer. Each server has its private IP address, and the load equalizer is in charge of its exoteric IP address, which comprises the processing module of the client port, the processing module of the server port, and the main control module. The processing module of the client port is set to recognize and transfer the data from the client. The processing module of the server port is set to recognize and transfer the data from the server. The main control module orderly matches the data required to be processed further to determine which actual server will process the data, and to establish the list of the stream rules between the processing module of the client port and the processing module of the server port.

17 Claims, 2 Drawing Sheets

U.S. PATENT DOCUMENTS

| | | | |
|---|---|---|---|
| 6,195,680 B1 * | 2/2001 | Goldszmidt et al. | 709/203 |
| 6,330,602 B1 * | 12/2001 | Law et al. | 709/224 |
| 6,389,448 B1 * | 5/2002 | Primak et al. | 718/105 |
| 6,389,462 B1 * | 5/2002 | Cohen et al. | 709/218 |
| 6,665,702 B1 * | 12/2003 | Zisapel et al. | 718/105 |
| 7,043,564 B1 * | 5/2006 | Cook et al. | 709/246 |
| 2002/0080752 A1 * | 6/2002 | Johansson et al. | 370/338 |
| 2002/0107962 A1 * | 8/2002 | Richter et al. | 709/225 |
| 2002/0194361 A1 * | 12/2002 | Itoh et al. | 709/233 |

FOREIGN PATENT DOCUMENTS

| | | | |
|---|---|---|---|
| JP | 2 000 315 200 A | 11/2000 | |
| WO | WO 0 140 962 A1 | 6/2001 | |

OTHER PUBLICATIONS

Cisco Systems, Printed Search Results from tools.cisco.com showing Apr. 29, 2001 Publication date of Cisco IOS reference relied upon, as obtained Dec. 20, 2008, 2 pages.*

Bommaiah et al., Design and Implementation of a Caching System for Streaming Media over the Internet, 1999, in IEEE Real Time Technology and Applications Symposium, pp. 111-121.*

ZDNet, Huawei admits copying Cisco code, Mar. 26, 2003, accessed at www.zdnet.co.uk/misc/print/0,1000000169,2132488-39001084c,00.htm on Jun. 3, 2009.*

* cited by examiner

METHOD AND APPARATUS FOR EQUALIZING LOAD OF STREAMING MEDIA SERVER

FIELD OF THE INVENTION

The present invention relates to a method and apparatus for equalizing load on the stream media servers.

BACKGROUND OF THE INVENTION

As stream media becomes more and more popular, people have more requirements for service-providing ability of stream media servers. Usually, a high-performance server supports only several thousands of concurrent connections and can't meet the access demand of a vast number of users. To solve this problem, a plurality of servers may be used, i.e., the user access is distributed to a plurality of servers so as to significantly increase the number of concurrent users that can be supported. In addition, as the number of servers increases, the number of users that can be supported will grow accordingly. In this way, during the access to stream media, the insufficient capability of stream media servers will become a bottleneck.

Currently, the above problem is usually solved with the DNS load equalizing method. With that method, a plurality of IP addresses can be obtained from the parsing of a same domain name, the IP addresses correspond to a plurality of servers. Thus the requests to one domain name are distributed to a plurality of servers which have independent IP addresses respectively. Though this method is simple and easy to implement, its drawback is also obvious: it is impossible to know the difference between the servers cannot and to distribute more requests to the servers of higher performance; in addition, it is unable to detect the current status of the servers, therefore, the requests may even be allocated to a single server: furthermore, too many public IP addresses are occupied, which is a fatal defect for an environment with limited public IP addresses. The method of equalizing load on stream media servers described hereinafter can solve said problem.

SUMMARY OF THE INVENTION

The object of the present invention is to provide a method and apparatus for equalizing load on the stream media servers so that a cluster of servers uses only one or several public IP addresses and employs specific load equalizing policies for load equalizing, so as to solve the problem that the processing capacity of a single server may be insufficient during access to the stream media servers.

According to an aspect of the present invention, there is provided a method for equalizing load on stream media servers, a load equalizer is disposed before the stream media servers which are trusted by the load equalizer, each server has its own private IP address, and the load equalizer is in charge of an exoteric IP address and comprises a processing module of client port, a processing module of server port, and a main control module, the method comprises the following steps: the processing module of client port intercepting a TCP request sent from a client in accordance with a first-class stream rule of the client port and forwarding the request to the main control module to obtain the address of an actual destination server; the main control module sending a Synchronize Number (SYN) packet from the client to the actual server; the processing module of server port intercepting a response sent from the actual server in accordance with a first-class stream rule of the server port and forwarding the response to the main control module to accomplish a Synchronize Number (SYN) response of the actual server; the main control module creating second-class stream rules at the client port and the server port respectively according to the address and Synchronize Number (SYN) information of the actual server so as to establish a Real Time Stream Protocol (RTSP) control channel between the two ports; the main control module creating third-class stream rules at the client port and the server port respectively according to information of the control channel so as to establish a data channel between the two ports.

In addition, the first-class stream rule of the client port and the first-class stream rule of the server port are default rules with low priority, respectively.

Furthermore, the second-class stream rule of the client port and the second-class stream rule of the server port are Real Time Stream Protocol (RTSP) classifying rules, i.e., classifying rules for the control channel.

Furthermore, the third-class stream rule of the client port and the third-class stream rule of the server port are Real Time Transport Protocol(RTP)_/Real Time Transport Control Protocol (RTCP) classifying rules, i.e., classifying rules for the data channel.

According to another aspect of the present invention, there is provided a load equalizer for equalizing load the stream media servers.

The load equalizer is before the stream media servers which are trusted by the load equalizer, each server has its own private IP address, and the load equalizer is in charge of an exoteric IP address, the load equalizer comprises: a processing module of client port which is adapted to recognize and forward data sent from a client to the main control module of the load equalizer or directly to the actual server according to actions defined in a matched rule list at the client port, a processing module of server port which is adapted to recognize and forward data sent from a server to the main control module of the load equalizer or directly to a client according to actions defined in a matched rule list at the server side, and a main control module which is adapted to perform rule matching to data required to be processed further so as to determine which actual server will process the data, and is adapted to establish stream rules of the processing module of client port and the processing module of server port.

DETAILED DESCRIPTION OF THE EMBODIMENTS

The definitions of the abbreviations in the present invention are as follows:
TCP: Transport Control Protocol;
UDP: User Datagram Protocol;
SYN: Synchronize Number, when a client initiates a new connection, SYN=1, after the connection is established, SYN=0 for other packets (See TCP/IP (Internet Protocol) protocol);
ACK: answer to command, when answering to a command, ACK is set to 1, i.e., ACK=1;
RTSP: Real Time Stream Protocol;
RTP: Real-Time Transport Protocol;

RTCP: Real-Time Transport Control Protocol;
DNS: Domain Name Server;
VIP: Virtual IP Address;
URL: Uniform Resource Locator, a method to indicate the position of information on WWW service programs on Internet.

The method for equalizing load of stream media servers may be implemented by software or hardware.

Figure 1:
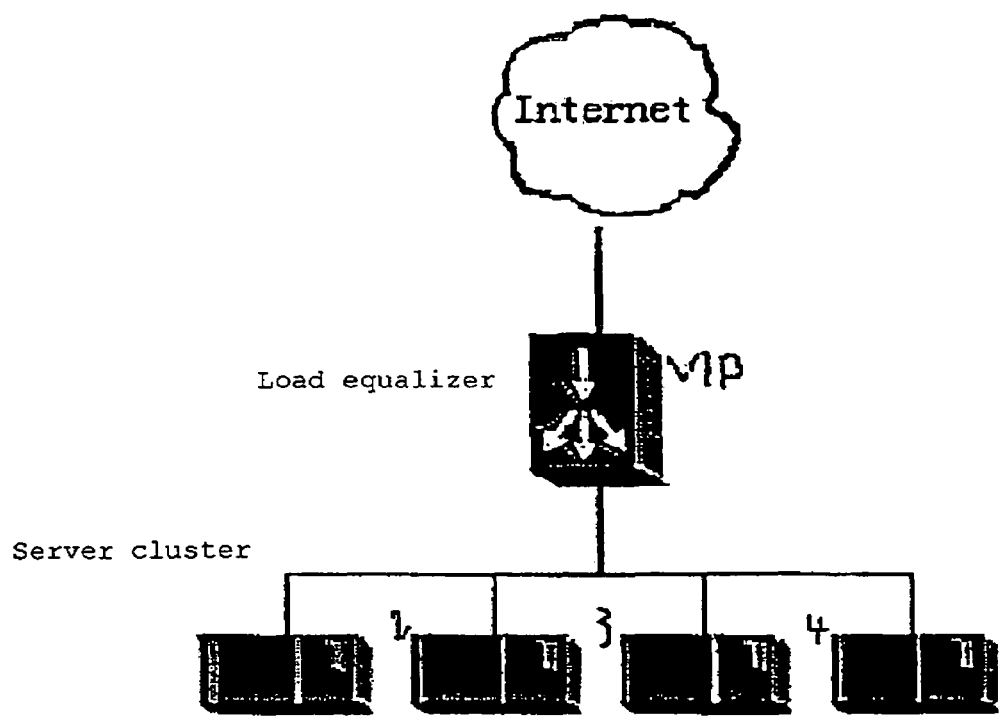
FIG. 1 shows the working scenario of a load equalizer.

The working scenario is: a load equalizer is disposed before the stream media servers which are trusted by the load equalizer, each server has its own private IP address, and the load equalizer is in charge of an exoteric IP address (also referred as Virtual IP (VIP) address). All user accesses are directed to the VIP address. The relationship between the load equalizer and the stream media servers is shown in FIG. 1: suppose there is a server cluster containing 4 stream media servers, each of the servers being denoted by 1, 2, 3 and 4 and having its own private IP address, for example, 10.110.9.5 for the server 1, 10.110.9.6 for the server 2, 10.110.9.7 for the server 3, and 10.110.9.9 for the server 3. The servers 1~4 can provide the same services, i.e., contain the same content. Suppose the processing capacity of the servers 1~4 is limited, for example, each of them can support 100 concurrent connections. Before the servers 1~4 there is disposed the load equalizer whose IP address is a public IP address, i.e., the exterior IP address, for example, 202.11.2.10. When a user wants to access the stream media service provided at that site from INTERNET, he/she may initiate a request to the server cluster with the destination IP address 202.11.2.10, that is, the request is directed to the load equalizer instead of any of the 4 actual servers 1~4. The load equalizer receives the request and allocates it to a specific server of the 4 actual servers 1~4 according to a certain policy. The above case shows the scenario of a single user. Now, suppose that the site is playing a good movie, a plurality of request packets will flow to the site. Therefore, one server is insufficient to support the requests due to its limited capacity (100 concurrent connections). The problem can be solved with a load equalizer. Similar to the above description, the load equalizer will distribute the requests to different actual servers so as to share the load among them. In this way, these servers can support 400 concurrent connections. If more concurrent connections are required, more actual servers can be added after the load equalizer.

Figure 2:
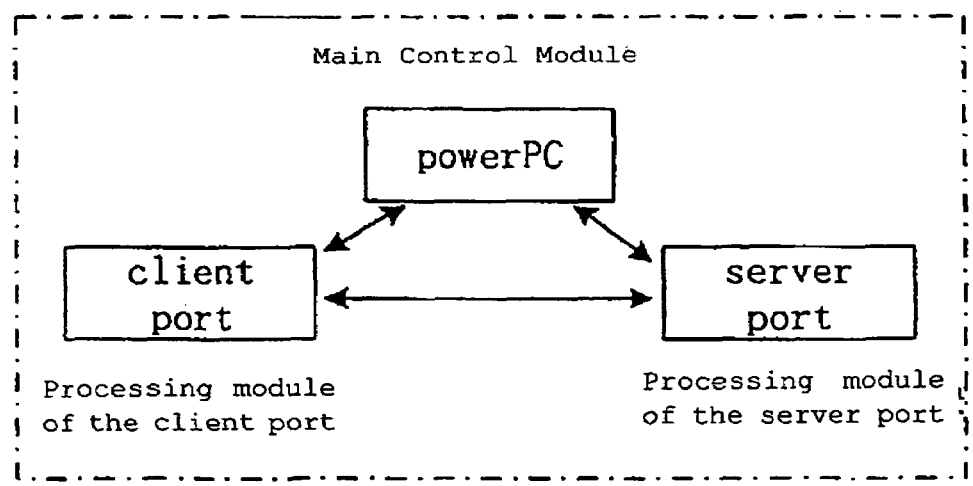
FIG. 2 is the schematic diagram of a stream media load equalizer.

The processing framework for stream media load equalizing, i.e., a load equalizer, mainly comprises a processing module of client port, a processing module of server port, and a main control module, as shown in FIG. 2. The processing module of client port is adapted to recognize and forward the data sent from a client to the main control module of the load equalizer or directly to the actual server according to the actions defined in a matched rule list, the processing module of server port is adapted to recognize and forward the data sent from a server to the main control module of the load equalizer or directly to a client according to the actions defined in a rule list matched with the server side, and the main control module is adapted to match the data required to be processed further with rules so as to determine which actual server will process the data and to establish the stream rules of the processing module of client port and the processing module of server port, such as CC2, CC3, CS2 and CS3. CC1 and CS1 are default rule lists that are created at the beginning of the processing (see Table 1 and Table 2).

Usually, the stream media protocols commonly used for stream media include RTSP and RTP/RTCP, wherein RTSP is used to transmit control information in the stream media; while RTP/RTCP is used to transmit data information in the stream media. Actually, the process at the load equalizer is to establish the control channel and the data channel between the processing module of client port and the processing module of server port. The control channel is represented by CC2 and CS2 in the load equalizer (see Table 1 and Table 2); whenever the two rules CC2 and CS2 are created, the RTSP control channel is established, and the control information can be forwarded directly through the channel. The data channel is represented by CC3 and CS3 in the load equalizer; whenever the two rules CC3 and CS3 are created, the data channel is established, and the data can be forwarded directly through the channel.

Therefore, there are two data structures in the load equalizer, i.e., the stream rule list of the client port (as shown in Table 1) and the stream rule list of the server module (as shown in Table 2). Hereinafter we describe how they are created.

There are two rule lists in all: the stream rule list for the processing module of client port and the stream rule list for the processing module of server port, and they are used to intercept the data packets from the client and the server respectively. Each rule list comprises 3 classes of rules, the first-class stream rules are permanent rules, such as CC1 and CS1, which are set during initialization and designed to intercept the packets for which the control channel and the data channel have not been established and to forward them to the main control module, which, according to the information in the packets, creates the second-class stream rules, such as CC2 and CS2, i.e., the control channel, and then creates the data channel such as CC3 and CS3 according to the information of the control channel. In this way, after the control channel and the data channel are established, the data belonging to the same stream can be transmitted through the channels. Hereinafter we will describe them in detail.

Figure 3:
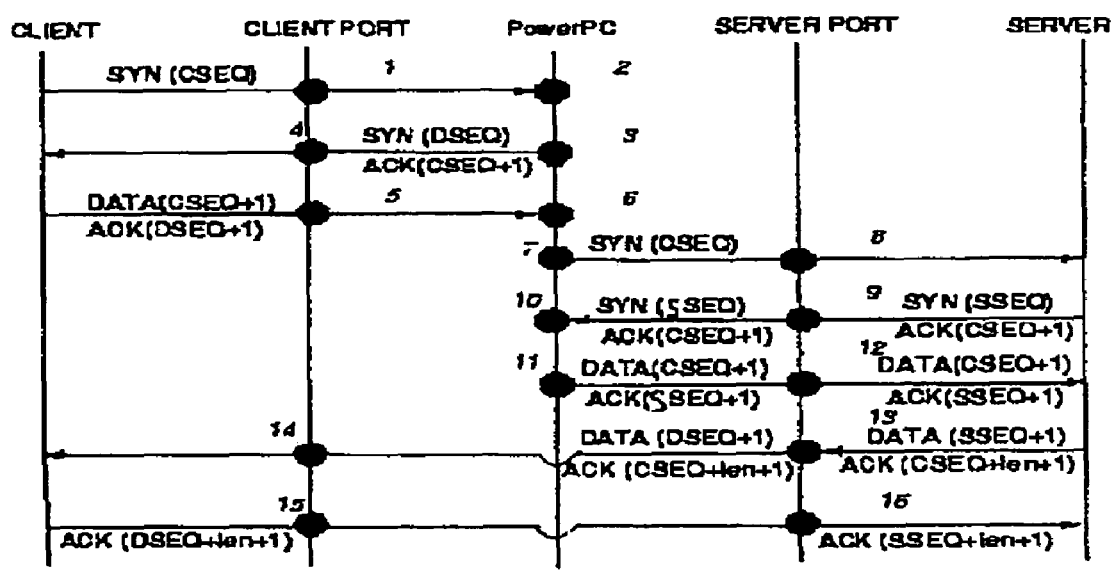
FIG. 3 shows the process of establishing RTSP control flow.

In order to describe the entire process of equalizing load of stream media, a RTSP session will be taken for an example, which is initiated by a client with the IP address CA, the port CP and the destination address VIP and the port 554 (the default port for stream media defined in RTSP is 554). FIG. 3 shows the establishing of the RTSP control channel, including every step of connection establishment and data transmission, and the names in FIG. 3 are: CLIENT, CLIENT PORT—the client port of the load equalizer, POWERPC—the main control module, SERVER PORT—the server port of the load equalizer, and the SERVER.

FIG. 3 shows only the establishing steps of the RTSP control channel (i.e., steps 1 to 16) without showing the establishing steps of the data channel. This is because the establishment of data channel is based on the control channel through extracting control data information. Hereunder the establishing process of the data channel is described. It is obvious that the establishment of the RTP/RTCP data channel is accomplished after the control channel is established, i.e., according to a "SETUP" packet from the client through the control channel, the response of the server to the "SETUP" packet is monitored and the RTP/RTCP port number information is obtained from the response so as to get necessary information to establish the RTP/RTCP data channel, then the RTP/RTCP data channel is established.

1. As described in steps 1 and 2, the client initiates a TCP request (SYN=1 because it is a new request) with a serial number CSEQ: the request is intercepted at the client port and is matched with the rule CC1 according to the stream class list as shown in Table 1. This rule forwards the TCP request to the CPU (i.e., the main control module) to process. It should be noted that because it is the first packet and its stream rule has not been created, it can be matched with only the rule CC1 with low priority.

2. As described in steps 3 and 4, the CPU simulates the server to return a SYN response:

3. As described in steps 5 and 6, the client receives the response and then initiates a RTSP request, which is intercepted by the rule CC1 at the client port and transferred to the CPU (step 5); The CPU identifies the RTSP request, parses it to obtain the URL, and performs matching operation for the URL to obtain the address of the actual destination server. In addition, it should be determined whether the "SETUP" method is used: if yes, the RTSP session serial number (Cseq) will be recorded;

4. As described in steps 7 and 8, the CPU sends the SYN packet with the serial number CSEQ sent from the client to the actual server according to the obtained information of the actual server;

5. As described in steps 9 and 10, the server returns a SYN response with the serial number "SSEQ" and the response number CSEQ+1: at the server port, the SYN response is intercepted by CS1 in the rule list as shown in table 2 and then transferred to the CPU. The server accomplishes the SYN response. At the same time, the stream class rule CC2 and the stream class rule CS2 are created at the client port and at the server port respectively according to the IP address of the actual server and SSEQ, as shown in Table 1 and Table 2. In this way, the RTSP control channel is established. Later, the control information belonging to the same stream can be transferred through the channel;

6. As described in steps 13, 14, 15 and 16. the CPU sends the RTSP packet with the serial number CSEQ+1 and the response serial number SSEQ+1 from the client to the actual server (steps 11 and 12); next, data can be transferred between the client and the server directly.

7. The server receives the RTSP request packet and initiates a RTSP response, which is intercepted by the server port of the load equalizer and matched with CS2; the serial number is converted accordingly (from SSEQ+1 to DSEQ+1), and the session response serial number (Cseq) is checked to verify whether it is identical to the "SETUP" session serial number (Cseq) of the same stream from the client: if yes, it indicates the packet is the response packet for the last. "SETUP", and the response packet will be transferred to the CPU. Then the process goes to step 8; otherwise it goes to step 9.

8. The CPU parses the response packet and extracts RTP/RTCP port numbers (including port numbers of the client and the server) from the response packet to the "SETUP" packet. RTP/RTCP stream rules such as CC3 in Table 1 and CS3 in Table 2 are added at the client port and the server port respectively. In this way, the RTP/RTCP direct channel is established. At the same time, the connection between CC2 and CC3 and the connection between CS2 and CS3 are established, i.e., once the RTSP stream in CC2 is known, the corresponding RTP/RTCP stream in CC3 is also known, in other words, whenever CS2 is known, the corresponding CS3 is known. As a result, the stream of a session (including RTSP and RTP/RTCP) can be deleted completely when the session ended. Then the process goes to step 9.

9. The packet with converted serial number is forwarded directly to the client according to the forwarding path in the matched rule.

The above described process is the process of establishing the entire RTSP and the corresponding RTP/RTCP stream rule. However, it is not that once the stream rule is established the CPU will not participate in the session. According to the rule list of client port (see Table 1, wherein one of the methods is CMP "SETUP"), when CC2 is matched, the next operation is to compare it with "SETUP" to determine whether it is a request of "SETUP"; if not, the request is forwarded as the route information: if yes, the request is forwarded to the CPU, and the RTSP session serial number of the request will be recorded, as described above. At the same time, the serial number is transferred to the corresponding rule of the server port. In the case that the session serial number of an RTSP response from the corresponding rule is identical to that of the last request, it indicates that the response is the response to the last "SETUP" request, and then the response is transmitted to the CPU to extract the RTP/RTCP port number, create RTP/RTCP stream rule lists at the server port and the client port, and then forward the response as the route information in the rule. Certainly, if the server response is not the response to "SETUP", the response is forwarded as route information in the rule.

Processing Process At the Client Port

First, the client initiates a RTSP request to the server, requesting for the service of server, the destination IP address is "VIP", which is the exoteric public IP address for all servers which is behind the load equalizer and trusted by the load equalizer. When the client port obtains the data, it forwards the data to a classifier for classifying. The rule list 1 (stream rule list at the client port) of the classifier is shown as follows:

TABLE 1

RTSP(RTP/RTCP) stream rule list at the client port

| Rule ID | SD: DD: SP: DP: P: FLAG | Type | Priority | Action |
|---------|------------------------|------|----------|--------|
| CC1 | *: VIP: *: 554: TCP: SYN | Perm | P1 | To CPU |
| CC2 | CD: VIP: CP: 554: TCP: ANY | Temp | P2 | Serial number conversion and comparison "SETUP" |
| CC3 | CD: VIP: CSP: CDP: UDP: ANY | Temp | P3 | To actual server |

The classifier processes the packet according to the information in layer 2, 3 and 4 in the packet. "Action tag" and "meta information" are associated with the classifier and both of them define how to process a data packet. The symbols in above table are defined as follows:

Rule ID: Stream Rule ID
SD: Source IP address
DD: Destination IP address
SP: Source port No.
DP: Destination Port address
P: Protocol Number
FLAG: indicates SYN or ASN
Type: indicates whether the rule is PERM (permanent) or TEMP (temporary)
Priority: P1—low priority, P2—high priority, if CC2 or CC3 don't match, CC1 will be applied.

Note: there are two types of classifiers: the permanent classifier and the temporary classifier. The permanent classifiers are created during initialization of the switch and can be changed only through modifying the configuration data. The temporary classifiers are created or deleted as the connections are established or deleted. In addition, each classifier has its priority, and the classifier with higher priority will function in case of any conflict. In the following example, priority $P_i$ is higher than $P_j$ if $i>j$.

It is obvious that there are 3 types of rules at the client port:
1. The TCP SYN packet matched with port 554 will be transmitted to the CPU directly;
2. Stream rule packets matched with port 554 will be matched, the RTSP method name will be compared with "SETUP" after the matching operation;
3. The stream matched with RTP/RTCP will be transferred to the server after the matching operation. Note:
1. For rule CC2, besides comparing with "SETUP", the actions also include converting serial number and searching for the route to the destination server by matching the route information in the server.
2. For rule CC3, the actions include only transferring route information to the destination server without the serial number conversion.

Processing process at the server port

The stream rules CC2 and CS2 are established at the client port and the server port respectively after the load equalizer shake hands with the server for three times. The stream rule list at the client port is described above. Hereunder we describe the stream rule list 2 at the server port:

TABLE 2

RTSP(RTP/RTCP) Stream Rule List at the Server Port

| Rule ID | SD: DD: SP: DP: P: FLAG | Type | Priority | Action |
|---|---|---|---|---|
| CC1 | *: VIP: *: 554: TCP: SYN | Perm | P1 | To CPU |
| CC2 | CD: VIP: CP: 554: TCP: ANY | Temp | P2 | serial number conversion, to CPU/client |
| CC3 | CD: VIP: CSP: CDP: UDP: ANY | Temp | P3 | To client |

Wherein:
Rule ID: Stream Rule ID;
SD: Source IP address;
DD: Destination IP address;
SP: Source port No.:
DP: Destination address;
P: Protocol Number;
FLAG: indicates whether it is synchronous packet or asynchronous packet;
Type: indicates whether the rule is PERM (permanent) or TEMP (temporary)
Priority: P1—low Priority, P2—high Priority, if CC2 and CC3 don't match, CC1 will be applied.

Note: there are two types of classifiers: permanent classifier and temporary classifier. The permanent classifiers are created during initialization of the switch and can only be changed through modifying the configuration data. The temporary classifiers are created or deleted as the connections are established or deleted. In addition, each classifier has its priority, and the classifier with higher priority will function in case of any conflict. In the following example, priority Pi is higher than Pj if i>j.

The CPU parses the RTSP request to obtain URL and then performs matching operation for the URL to obtain the address of the actual server. Next, it forwards the request packet sent from the client to the address of the actual server; after three handshaking operations, the CS2 is established (as described above); then all RTSP responses sent by the server will be intercepted by CS2; after CS2 intercepts a RTSP response, it converts the response serial number and then detects whether the FLAG is set to 1; if the FLAG is not set to 1, the RTSP response is sent to the client directly as the route information; if the FLAG is set to 1, CS2 will compare the session serial number (Cseq) with the provided serial number; if they are equal, the packet will be sent to the CPU; otherwise the packet is routed to the client directly.

The response to "SETUP" is parsed to obtain the RTP/RTCP port number and thus establish CC3 and CS3 between the client port and the server port (as described above); for CS3, any matched response will be routed directly; however, certain association shall be established between CS3 and corresponding RTSP CS2 so that the session can be deleted completely when necessary.

Therefore, there are 3 rule classes at the server port, just like at the client port:
1. The TCP synchronous packet matched with the port 554 will be transmitted to the CPU directly;
2. Stream rule packets matched with the port 554 will be forwarded according to the specific circumstances after the matching operation;
3. The stream matched with RTP/RTCP will be transmitted to the client after the matching operation.

Processing processes at the main control module

The processing processes at the main control module (i.e., CPU) mainly comprise:
1. Processing SYN packets (all SYN packets from the client will be processed by the CPU);
2. Processing "SETUP" request packets sent from the client (recording their serial numbers, and then sending the serial numbers to corresponding rules at the server port); processing the "SETUP" response packets sent from the server (parsing the packets and extracting the information of the RTP/RTCP port);
3. Creating and distributing rule lists including RTSP rules and RTP/RTCP rules.

The above description explains the load equalizing process of stream media and presents a method of equalizing the load.

As described above, the invention can effectively solve the problem of insufficient service-providing ability of stream media server. The load equalizing capability of the existing DNS load equalizing method is quite limited; however, the method of equalizing load on stream media servers in the present invention is more intelligent, comprehensive and flexible.

The above load equalizing function can be implemented with a network processing unit, the route forwarding of data packets can be implemented with microcode of the network processing unit, and the analysis and process above the TCP/IP layer can be achieved with the embedded CORE in the network processing unit. To achieve higher performance, a distributed processing system can be used.

The invention claimed is:
1. A method of equalizing load on stream media servers, wherein each server has its own private IP address, the method comprises the following steps of:
   a processing module of client port, comprised in a load equalizer which is disposed before the stream media servers which are trusted by the load equalizer, intercepting a TCP request from a client with a first-class stream rule of a client port and forwarding the TCP request to a main control module in the load equalizer to obtain the address of an actual destination server of the stream media servers, wherein the load equalizer is in charge of a public IP address;
   the main control module sending a Synchronize Number (SYN) packet sent from the client to the destination server;

a processing module of server port in the load equalizer intercepting a response sent from the destination server with a first-class stream rule of a server port and forwarding the response to the main control module so that the destination server accomplishes a Synchronize Number (SYN) response;

the main control module creating a second-class stream rule of the client port and a second-class stream rule of the server port respectively according to the address and Synchronize Number (SYN) information of the destination server so as to establish a Real Time Stream Protocol (RTSP) control channel between the client port and the server port;

the main control module creating a third-class stream rule of the client port and a third-class stream rule of the server port respectively according to information of the control channel so as to establish a data channel between the client port and the server port.

2. The method according to claim 1, wherein the first-class stream rule of the client port and the first-class stream rule of the server port are default 3. The method according to claim 1, wherein the second-class stream rule of the client port and the second-class stream rule of the server port are Real Time Stream Protocol (RTSP) classifying rules which are classifying rules for the control channel.

4. The method according to claim 1, wherein the third-class stream rule of the client port and the third-class stream rule of the server port are Real-Time Transport Protocol/Real-Time Transport Control Protocol (RTP/RTCP) classifying rules which are classifying rules for the data channel.

5. The method according to claim 1, wherein after the step of forwarding the TCP request sent from the client to the main control module, the method further comprises a step of returning a Synchronize Number (SYN) response to the client by the main control module.

6. The method according to claim 5, after the step of returning a Synchronize Number (SYN) response to the client, the method further comprises a step of initiating a Real Time Stream Protocol (RTSP) request by the client and intercepting the Real Time Stream Protocol (RTSP) request and forwarding the Real Time Stream Protocol (RTSP) request to the main control module by the processing module of client port.

7. The method according to claim 6, further comprising a step of sending the Real Time Stream Protocol (RTSP) request to the destination server by the main control module.

8. The method according to claim 7, further comprising a step of initiating a Real Time Stream Protocol (RTSP) response by the destination server on receiving the Real Time Stream Protocol (RTSP) request, and intercepting and converting a serial number of the Real Time Stream Protocol (RTSP) response and sending the response to the main control module by the processing module of server port.

9. A method of equalizing load on stream media servers, comprising:

setting a processing module of a client port to intercept a TCP request sent from a client in accordance with a first-class stream rule at the client port and to forward the request to a main control module of a load equalizer to obtain an address of a destination server, wherein the load equalizer is disposed before the stream media servers, each server has a private IP address, and the load equalizer is in charge of a public IP address;

the main control module sending a Synchronize Number (SYN) packet sent from the client to the destination server;

setting a processing module of a server port of the load equalizer to intercept a response from the destination server in accordance with a first-class stream rule at the server port and to forward the response to the main control module so that the destination server accomplishes a Synchronize Number (SYN) response;

the main control module creating a second-class stream rule at the client port and a second-class stream rule the server port according to an address and SYN information of the destination server, so as to establish a Real Time Stream Protocol (RTSP) control channel between the client port and the server port; and the main control module creating a third-class stream rule at the client port and a third-class stream rule the server port according to certain information of the Real Time Stream Protocol (RTSP) control channel so as to establish a data channel between the client port and the server port.

10. The method according to claim 9, wherein the first-class stream rule at the client port and the first-class stream rule at the server port are default rules with low priority.

11. The method according to claim 9, wherein the second-class stream rule at the client port and the second-class stream rule at the server port are Real Time Stream Protocol (RTSP) classifying rules which are classifying rules for the control channel.

12. The method according to claim 9, wherein the third-class stream rule at the client port and the third-class stream rule at the server port are Real-Time Transport Protocol/Real-Time Transport Control Protocol (RTP/RTCP) classifying rules which are classifying rules for the data channel.

13. The method according to claim 9, wherein after the step of forwarding the TCP request sent from the client to the main control module, the method further comprises a step of returning a Synchronize Number (SYN) response to the client by the main control module.

14. The method according to claim 13, after the step of returning a Synchronize Number (SYN) response to the client, the method further comprises a step of initiating a Real Time Stream Protocol (RTSP) request by the client and intercepting the Real Time Stream Protocol (RTSP) request and forwarding the Real Time Stream Protocol (RTSP) request to the main control module by the processing module of client port.

15. The method according to claim 14, further comprising a step of sending the Real Time Stream Protocol (RTSP) request to the destination server by the main control module.

16. The method according to claim 15, further comprising a step of initiating a Real Time Stream Protocol (RTSP) response by the destination server on receiving the Real Time Stream Protocol (RTSP) request, and intercepting and converting a serial number of the Real Time Stream Protocol (RTSP) response and sending the response to the main control module by the processing module of server port.

17. A load equalizer for equalizing load on stream media servers, wherein the load equalizer is disposed before the stream media servers which are trusted by said load equalizer, each server has its own private IP address, and the load equalizer is in charge of a public IP address, the load equalizer comprises:

processing module of client port, adapted to intercept a TCP request from a client with a first-class stream rule of a client port and forward the TCP request to a main control module in the load equalizer to obtain the address of an actual destination server;

the main control module including a processor and being adapted to send a Synchronize Number (SYN) packet sent from the client to the destination server; and a processing module of server port, adapted to intercept a response sent from the destination server with a first-class stream rule of a server port and forward the response to the main control module so that the destination server accomplishes a Synchronize Number (SYN) response, wherein the main control module is further adapted to create a second-class stream rule of the client port and a second-class stream rule of the server port respectively according to the address and Synchronize Number (SYN) information of the destination server so as to establish a Real Time Stream Protocol (RTSP) control channel between the client port and the server port, and create a third-class stream rule of the client port and a third-class stream rule of the server port respectively according to information of the control channel so as to establish a data channel between the client port and the server port.

* * * * *